Jan. 31, 1967 W. A. TRICKEY 3,301,998
HUMIDIFIER HAVING FLOATING HEATING MEANS
Filed July 22, 1964 2 Sheets-Sheet 1
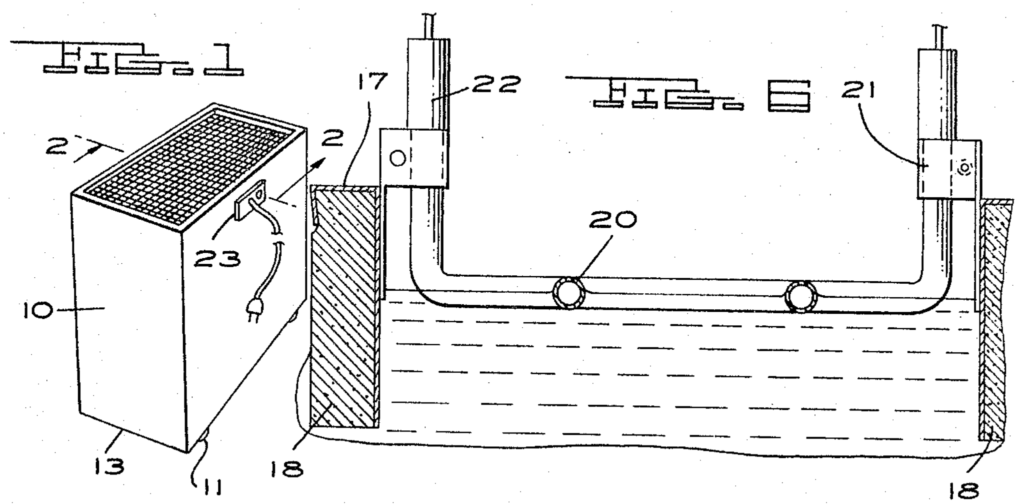
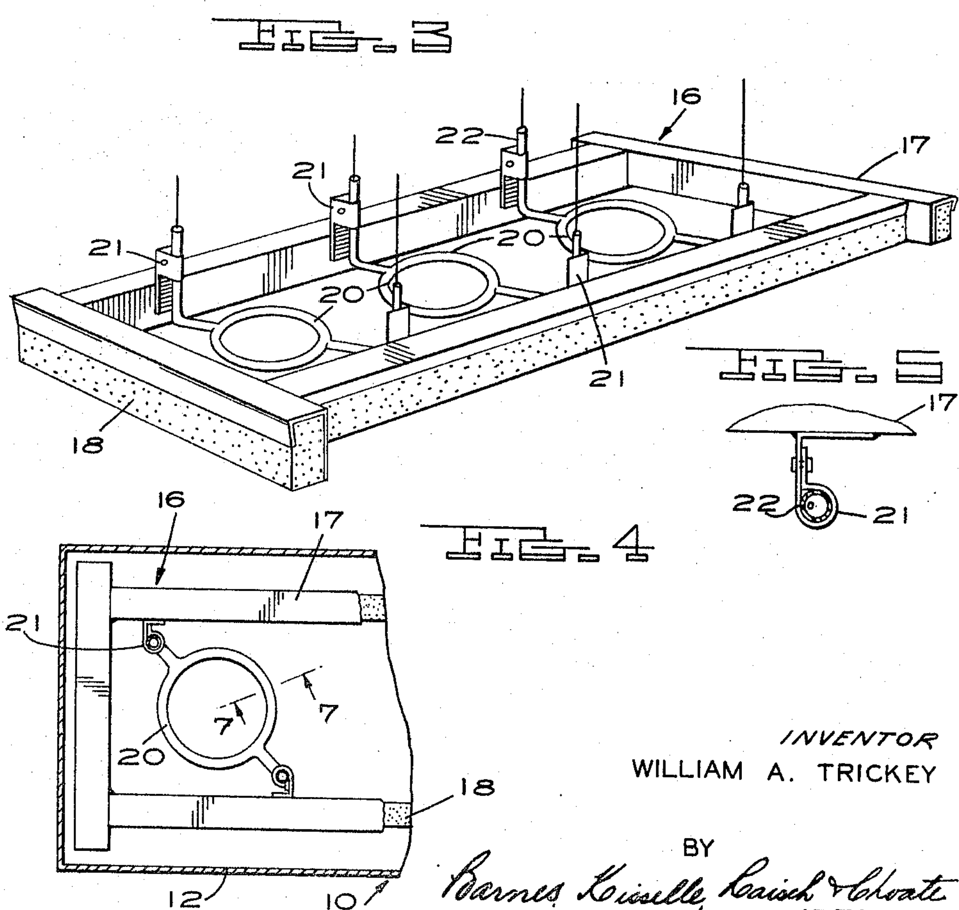
INVENTOR
WILLIAM A. TRICKEY
BY
Barnes, Kisselle, Raisch & Choate
ATTORNEYS HUMIDIFIER HAVING FLOATING HEATING MEANS
Filed July 22, 1964 2 Sheets-Sheet 2
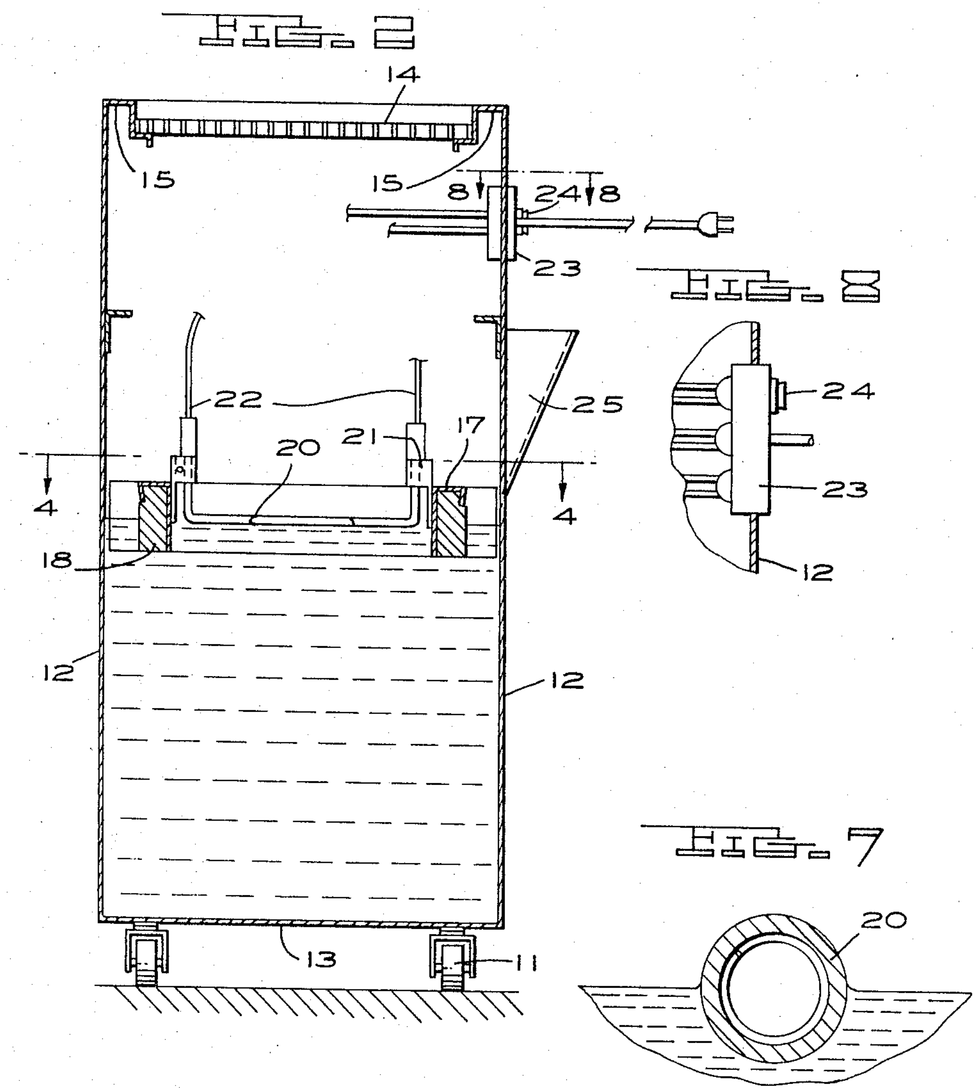
INVENTOR
WILLIAM A. TRICKEY
BY
Barnes, Kisselle, Raisch & Choate
ATTORNEYS

United States Patent Office 3,301,998

Patented Jan. 31, 1967

3,301,998

HUMIDIFIER HAVING FLOATING HEATING MEANS

William A. Trickey, 450 Colborne St., Brantford, Ontario, Canada

Filed July 22, 1964, Ser. No. 384,432
3 Claims. (Cl. 219—317)

This invention relates to humidifiers and particularly to humidifiers of the portable type for increasing the humidity in a building interior.

It is an object of the invention to provide a humidifier which has large capacity thereby eliminating the need for frequent renewal of the supply of water; which is readily adjustable to produce varying amounts of water into the atmosphere; which has a minimum number of parts; and which can be manufactured at low cost.

In the drawings:

FIG. 1 is a perspective view of a humidifier embodying the invention.

FIG. 2 is a sectional view on an enlarged scale taken along the line 2—2 in FIG. 1

FIG. 3 is a perspective view of a portion of the humidifier.

FIG. 4 is a fragmentary plan view of the portion of the humidifier shown in FIG. 3.

FIG. 5 is a fragmentary sectional view on an enlarged scale taken along the line 5—5 in FIG. 4.

FIG. 6 is a sectional view on an enlarged scale taken along the line 6—6 in FIG. 4.

FIG. 7 is a partly diagrammatic sectional view showing the relationship of the heating element to the surface of the water.

FIG. 8 is a fragmentary sectional view taken along the line 8—8 in FIG. 2.

Referring to FIG. 1, the humidifier embodying the invention comprises a container or housing 10 which is generally rectangular and preferably has casters 11 on the underside thereof for movably supporting it on the floor of a room. The container preferably has slightly tapered sides 12 tapered downwardly and inwardly toward the bottom wall 13. The upper end of the container is open and a grill 14 is provided thereon resting on an inwardly turned flange 15.

A heater assembly 16 (FIG. 3) is provided within the container in floating relation, as presently described. Heater assembly 16 comprises a frame 17 made of a material such as aluminum. The frame ring-like 17 comprises U-shaped channel members and a foam plastic material 18 is positioned within the U-shaped channel members to support the frame 17 on the surface of the water.

A plurality of heating elements 20, such as Calrod elements, preferably in the form of readily replaceable units, are supported by clamps 21 in the open space defined by the frame 17. The heating elements 20 are positioned vertically with respect to the frames 17 such that the plane of the heating elements 20 lies substantially at the surface of the water and preferably with a portion of a heating element exposed as shown in FIG. 7.

Flexible wires 22 extend from the heating elements to a control panel 23 wherein a switch 24 can be actuated to selectively energize any one or all of the heating elements 20.

In practice the water may be introduced through the top of a container or, alternatively, an opening 25 can be provided for introducing the water from the rear of the container.

In operation, when one or more of the heating elements are energized, the heat therefrom heats the water surrounding the heating element and quickly vaporizes it causing the water to immediately move upwardly into the atmosphere within the container and then through the grill 14 to the atmosphere of the room. Since only the water adjacent the heating elements 20 is being heated and the water vapor need only move to the atmosphere and not through relatively cooler water, an efficient quick production of water vapor is achieved. As the level of water in the container falls, the frame 17 moves downwardly maintaining the heating elements in the proper relation to the surface of the water. The sides of the frame 17 are positioned in close proximity to the internal surfaces of the container 12 so that the frame 17 is guided in its movement downwardly and thereby maintains the heating elements in position substantially centrally of the container.

It can thus be seen that there has been provided a humidifier that contains a large body of water eliminating the need for frequent replenishment; which quickly produces large volumes of water vapor; which has relatively few parts; and which can be produced at low cost. Furthermore, the heating units which are positioned adjacent the surface of the open body of water are readily accessible and easily replaceable.

What I claim is:

1. In a humidifier, the combination comprising a container for holding a body of water, a ring-like frame, float means on said frame for floating said frame for free vertical movement on the surface of said body of water in said container, the area surrounded by said frame being completely free and unobstructed to permit water to flow freely upwardly from said container into said area and to permit steam to flow upwardly from said area, a plurality of exposed heating elements, means for supporting said heating elements on said frame in said unobstructed area in position substantially at the surface of the water with a portion only of said heating elements exposed and with the greater dimension of said heating elements extending substantially horizontally, whereby when the heating elements are energized the water immediately adjacent the heating elements is heated and vaporized and passes upwardly to the atmosphere immediately surrounding the heating elements and water passes freely from beneath said heating elements to said heating elements.

2. The combination set forth in claim 1 wherein said frame and said housing are rectangular.

3. The combination set forth in claim 1 wherein said float means comprises foam plastic material.

References Cited by the Examiner

UNITED STATES PATENTS

| | | | |
|---|---|---|---|
| 1,018,558 | 2/1912 | Hadaway | 219—317 |
| 1,420,692 | 6/1922 | Cohen | 219—317 |
| 1,430,548 | 10/1922 | Hogue | 219—273 |
| 2,279,196 | 4/1942 | Herman | 219—317 |
| 2,336,011 | 12/1943 | Haberstump | 219—317 X |
| 2,747,605 | 5/1956 | Adams | 73—322.5 |
| 2,875,314 | 2/1959 | Schreyer | 219—317 |
| 3,219,795 | 11/1965 | Wiseman | 219—317 |

FOREIGN PATENTS

| | | |
|---|---|---|
| 876,306 | 7/1942 | France. |
| 305,818 | 2/1929 | Great Britain. |

ANTHONY BARTIS, *Primary Examiner.*